(12) United States Patent
Kotani et al.

(10) Patent No.: US 8,272,050 B2
(45) Date of Patent: Sep. 18, 2012

(54) DATA MANAGING DEVICE EQUIPPED WITH VARIOUS AUTHENTICATION FUNCTIONS

(75) Inventors: Seigo Kotani, Kawasaki (JP); Shigenori Baba, Kawasaki (JP)

(73) Assignee: Fujitsu Semiconductor Limited, Yokohama (JP)

(*) Notice: Subject to any disclaimer, the term of this patent is extended or adjusted under 35 U.S.C. 154(b) by 1467 days.

(21) Appl. No.: 11/500,419

(22) Filed: Aug. 8, 2006

(65) Prior Publication Data

US 2006/0277414 A1 Dec. 7, 2006

Related U.S. Application Data

(63) Continuation of application No. PCT/JP2004/006268, filed on Apr. 30, 2004.

(51) Int. Cl.
G06F 21/00 (2006.01)

(52) U.S. Cl. .............. 726/21; 726/5; 726/17; 713/189

(58) Field of Classification Search .............. 713/189; 340/5.52, 5.82; 726/5, 17, 21; 380/273, 380/277–286
See application file for complete search history.

(56) References Cited

U.S. PATENT DOCUMENTS

| | | | |
|---|---|---|---|
| 6,564,232 B1* | 5/2003 | Cole et al. ..................... | 707/203 |
| 7,246,247 B2 | 7/2007 | Matsuzaki et al. | |
| 2002/0069213 A1* | 6/2002 | Moslander et al. ........... | 707/203 |
| 2003/0023770 A1 | 1/2003 | Barmettler et al. | |
| 2003/0037246 A1 | 2/2003 | Goodman et al. | |
| 2003/0070079 A1 | 4/2003 | Cromer et al. | |
| 2003/0182569 A1 | 9/2003 | Matsuzaki et al. | |
| 2004/0085188 A1 | 5/2004 | Minemura | |
| 2004/0243805 A1* | 12/2004 | Enokida ........................ | 713/175 |
| 2004/0255168 A1* | 12/2004 | Murashita et al. ............ | 713/202 |
| 2005/0058294 A1* | 3/2005 | Chen et al. .................... | 380/277 |
| 2005/0169468 A1* | 8/2005 | Fahrny et al. ................. | 380/210 |
| 2007/0234074 A1 | 10/2007 | Matsuzaki et al. | |

FOREIGN PATENT DOCUMENTS

| | | |
|---|---|---|
| EP | 1 271 875 A | 1/2003 |
| JP | 3-58174 A | 3/1991 |
| JP | 10-145354 A | 5/1998 |
| JP | 10-283190 A | 10/1998 |
| JP | 2003-58379 A | 2/2003 |
| JP | 2003-122588 A | 4/2003 |
| JP | 2003-140761 A | 5/2003 |
| JP | 2003-168006 A | 6/2003 |
| JP | 2003-271937 A | 9/2003 |
| JP | 2003-337749 A | 11/2003 |
| WO | WO 98/15082 A | 4/1998 |

OTHER PUBLICATIONS

Jun Miyake, "Semiconductors Supporting Network Era", Hitachi Hyouron, Extra Edition of Hitachi-Hyouron Limited, Oct. 2001, pp. 9-14.

* cited by examiner

Primary Examiner — Edward Zee
Assistant Examiner — Chi Nguy
(74) Attorney, Agent, or Firm — Arent Fox LLP

(57) ABSTRACT

A data managing device with a single chip that includes: first hardware that authenticates security of communication performed by a data processing apparatus that houses the data managing device; second hardware that performs different processing from processing performed by the first hardware; and third hardware that receives an update program for a program executed by any one of the first hardware and the second hardware, from a data providing apparatus with which security of communication is authenticated by the first hardware, and updates the program by the update program.

10 Claims, 19 Drawing Sheets

| NAME OF AUTHORIZED PERSON | ELECTRONIC CERTIFICATE |
|---|---|
| A | Ca |
| B | Cb |
| C | Cc |
| ⋮ | ⋮ |
| Z | Cz |

- VERSION
- SIGNATURE ALGORITHM
- NAME OF ISSUER
- EXPIRATION DATE
- PUBLIC KEY
- RELATED DATA

FIG.7

| NAME OF PERIPHERAL DEVICE | PERIPHERAL DEVICE VERSION | SOFTWARE NAME OF SOFTWARE | SOFTWARE VERSION | EXECUTION PROGRAM NAME OF PROGRAM | EXECUTION PROGRAM VERSION |
|---|---|---|---|---|---|
| D1 | 1.1 | Sa | 5.0 | BIOMETRICS | 2.5 |
| D2 | 3.2 | Sb | 4.1 | COMMUNICATION AUTHENTICATION | 1.0 |
| D3 | 1.0 | Sc | 1.0 | INTERNAL DATA AUTHENTICATION | 6.1 |
| ･･･････ | ･･･････ | ･･･････ | ･･･････ | ･･･････ | ･･･････ |

DATA MANAGING DEVICE EQUIPPED WITH VARIOUS AUTHENTICATION FUNCTIONS

CROSS-REFERENCE TO RELATED APPLICATION

This application is a continuation of International Application No. PCT/JP2004/006268, filed Apr. 30, 2004, the entire specification claims and drawings of which are incorporated herewith by reference.

BACKGROUND OF THE INVENTION

1. Field of the Invention

The present invention relates to a data managing device equipped with various authentication functions, such as user authentication and environment authentication.

2. Description of the Related Art

Recently, due to the introduction of internet protocol version 6 (IPv6), not only a personal computer, a server computer, and a cellular phone, but also household electrical appliance (such as a refrigerator, a microwave, an air conditioner, a television (TV), and a digital versatile disc (DVD) drive), a copy machine, and a robot, etc. have been connected to a network such as the Internet to perform data communication. However, an increased number of data processing apparatuses connected to a network leads to weaker security.

As a result of its poor security, the household electrical appliance is likely to receive a program preventing its normal operation from an external source, or to be abused for a distributed denial of service (DDoS) attack. For the enhancement of security, a data processing apparatus with a function of biometric authentication using a fingerprint has been suggested (see, for example, Japanese Patent Laid-Open No. H3-58174).

Before performing an electronic commerce using such a data processing apparatus, it is preferable to ensure the security by checking whether a user of the apparatus is a proper owner, whether the apparatus that performs the electronic commerce is an apparatus of the proper owner, and whether the apparatus is connected with other apparatuses or installed with software (such as an operating system (OS), a browser, plug-in software, etc.) that degrade the security of the apparatus.

Furthermore, biometrics using biological data, user authentication (public key infrastructure (PKI) authentication) using an electronic certificate issued by a certificate authority, and environment authentication for the secrecy of data on the data processing apparatus have been suggested. A recording medium driver that can take various security measures without increasing manufacturing cost has also been suggested (see, for example, Japanese Patent Laid-Open No. H10-283190).

However, according to the conventional technology described above, it is difficult to achieve high security solely with the biometrics authentication because fingerprint data for the authentication might be leaked.

Furthermore, when a software patch, a firmware patch, etc. is provided for those data processing apparatuses, it is necessary to ensure sufficient security between an apparatus of a provider and the data processing apparatuses so that the software is not falsified by a third party during the transmission of the software. However, a too-high security level can prevent smooth data communication.

When a single data processing apparatus individually performs various authentication such as biometrics, user authentication, environment authentication, etc., mutual authentication is required when data is exchanged among those authentication. Therefore, besides each authentication function, another authentication function is required to exchange data among those authentication functions, thereby increasing cost of manufacturing and time for authentication.

Furthermore, the frequency, the amount, and the method of updating a program (such as firmware) or data are different for each authentication because the biometrics, the user authentication, and the environment authentication are authentication functions used for different purposes.

As a result, when those authentication functions are mounted on a single chip, it is usually necessary to update (remake in many cases) the entire chip every time the program or the data is updated, which is actually impractical from the standpoint of cost. If the chip is remade every time the program or the data is updated, it is inconvenient for a user because the user cannot use the apparatus while the program or the data is being updated.

Furthermore, each authentication function should be timely updated to achieve its original purpose of authentication. Therefore, it is meaningless to perform authentication with an authentication function which is not updated until other authentication function is updated (in other words, which is updated at the same time of the update of other authentication function).

SUMMARY OF THE INVENTION

It is an object of the present invention to at least solve the problems in the conventional technology.

A data managing device according to an aspect of the present invention includes a single chip. The single chip includes: first hardware that authenticates security of communication performed by a data processing apparatus that houses the data managing device; second hardware that performs different processing from processing performed by the first hardware; and third hardware that receives an update program for a program executed by any one of the first hardware and the second hardware, from a data providing apparatus with which security of communication is authenticated by the first hardware, and updates the program by the update program.

A data managing method according to another aspect of the present invention is for a data managing device. The data managing device is housed in a data processing apparatus, and includes a single chip with first hardware and second hardware. The first hardware authenticates security of communication performed by the data processing apparatus, and the second hardware performs different processing from processing performed by the first hardware. The data managing method comprising: receiving an update program for a program executed by any one of the first hardware and the second hardware, from a data providing apparatus with which security of communication is authenticated by the first hardware; and updating the program by the update program.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 7 is a diagram of internal data stored in a memory/storage;

DETAILED DESCRIPTION OF THE PREFERRED EMBODIMENTS

Exemplary embodiments of the present invention will be explained in detail with reference to the accompanying drawings.

Figure 1:
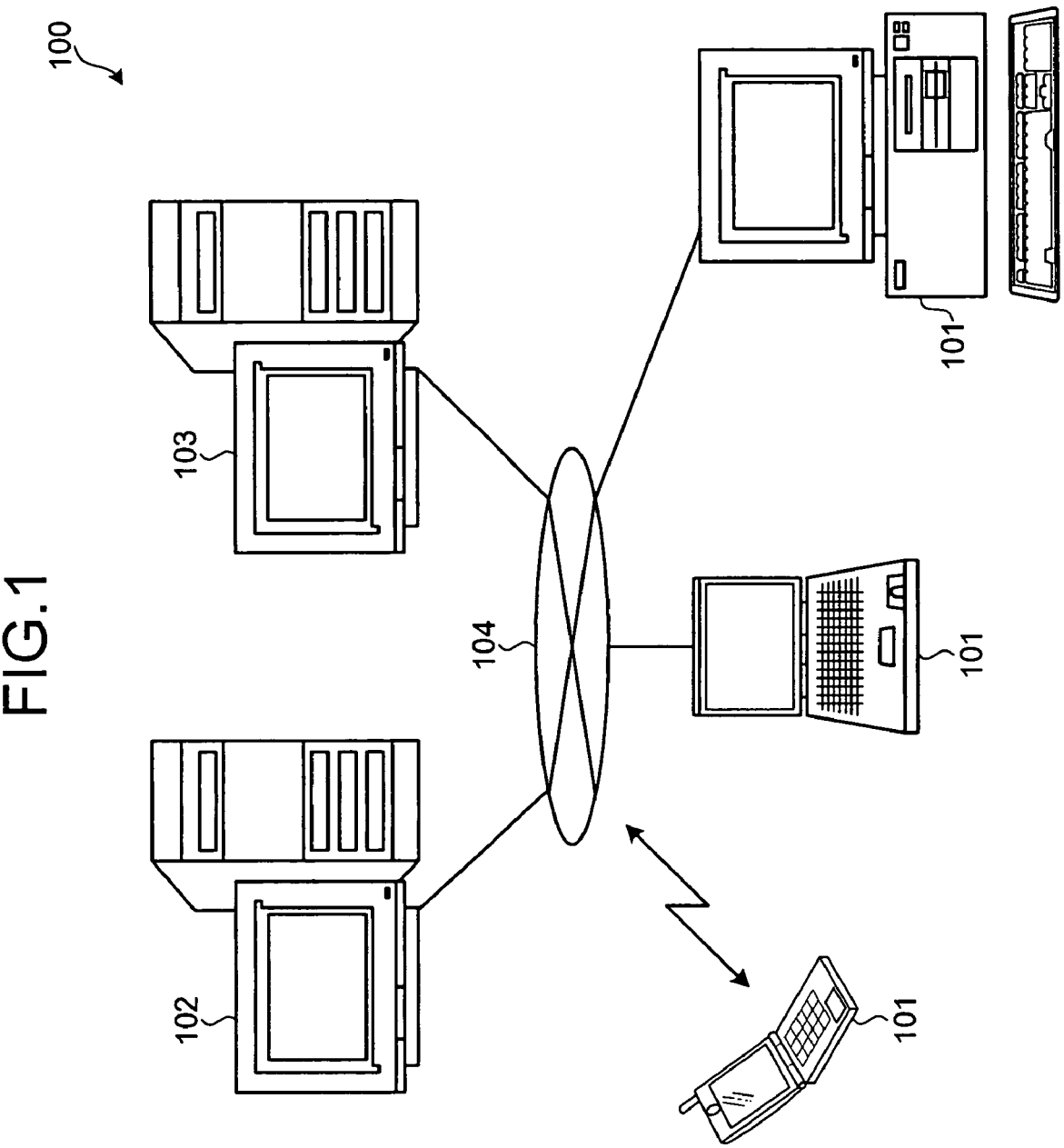
FIG. 1 is a diagram of a configuration of a data managing system according to an embodiment of the present invention.

FIG. 1 is a diagram of a configuration of a data managing system according to an embodiment of the present invention. A data managing system 100 shown in FIG. 1 includes a user's data processing apparatus 101, a data providing apparatus 102 that provides an execution program or data in the data processing apparatus 101, and an authentication apparatus 103 in a certificate authority. The apparatuses 101 to 103 are connected via a network 104 such as the Internet.

The data processing apparatus 101 is, for example, a cellular phone, a personal computer, a server computer, an electrical appliance (such as a refrigerator, a microwave, an air conditioner, a TV, a DVD, etc.), a copy machine, a robot, etc. A security chip is installed in the data processing apparatus 101.

The data providing apparatus 102 is managed by a vender or a maker that develops or sells an execution program and various data, or by a trader that manufactures or sells the data processing apparatus 101. The data providing apparatus 102 stores therein, or uploads to the network 104, an update program for the execution program and various data. The data providing apparatus 102 also generates an electronic signature of the execution program and various data. The authentication apparatus 103 issues and manages electronic certificates of a user, a maker, a vendor, a distributor, etc. The authentication apparatus 103 also generates an electronic signature of the issued electronic certificate.

Figure 2:
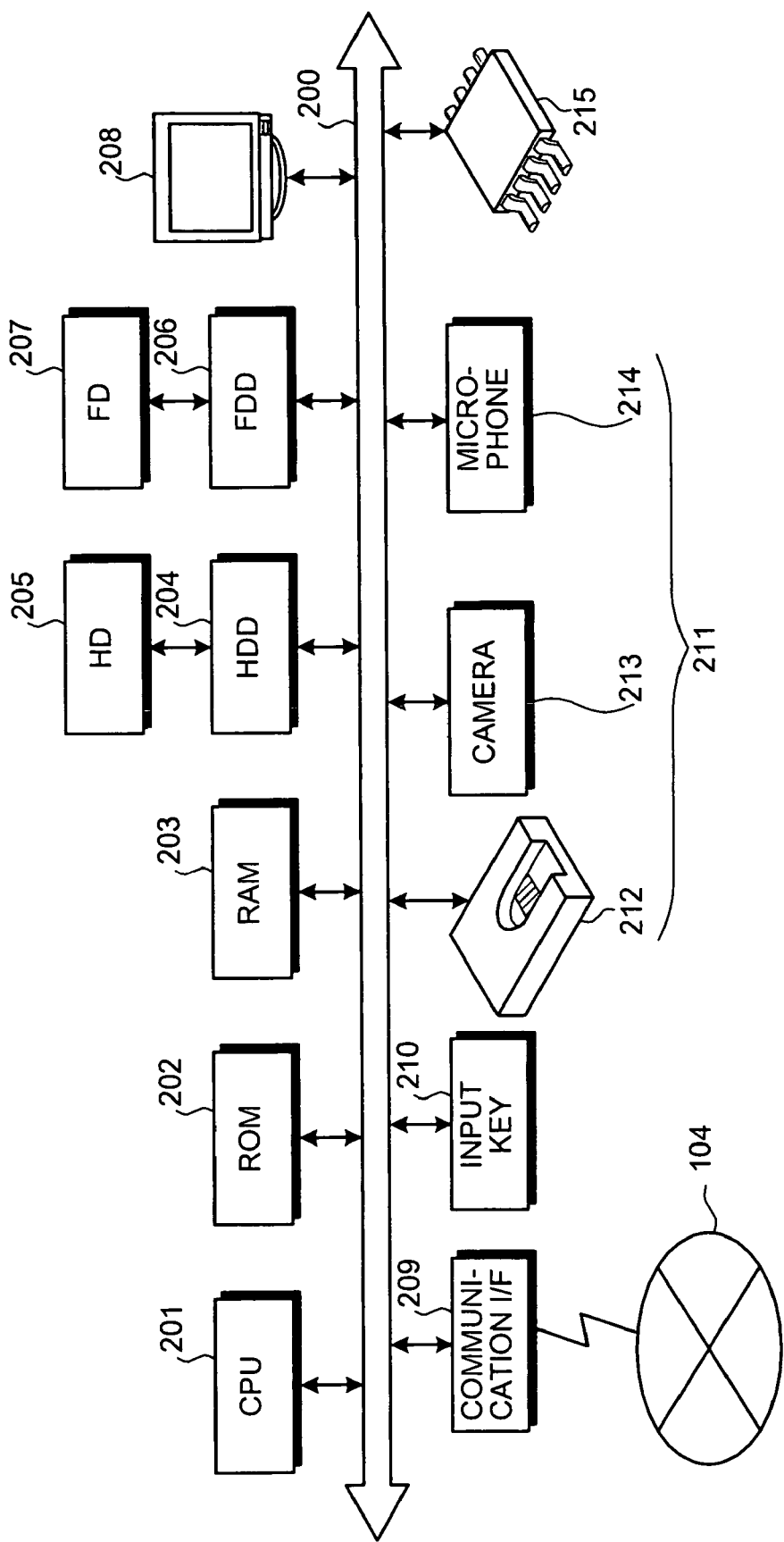
FIG. 2 is a block diagram of a hardware configuration of a data processing apparatus.

FIG. 2 is a block diagram of a hardware configuration of the data processing apparatus 101. As shown in FIG. 2, the data processing apparatus 101 includes a central processing unit (CPU) 201, a read only memory (ROM) 202, a random access memory (RAM) 203, a hard disk drive (HDD) 204, a hard disk (HD) 205, a flexible disk drive (FDD) 206, a flexible disk (FD) 207 as an example of a removable recording medium, a display 208, a communication interface (I/F) 209, an input key 210 (such as a keyboard and a mouse), a biological sensor 211, and a security chip 215. These units are connected via a bus 200.

The CPU 201 controls the entire data processing apparatus 101. The ROM 202 stores a program such as a boot program. The RAM 203 is used as a work area of the CPU 201. The HDD 204 controls reading/writing of data from/to the HD 205 based on control of the CPU 201. The HD 205 stores data written in accordance with control of the HDD 204.

The FDD 206 controls reading/writing of data from/to the FD 207 based on control of the CPU 201. The FD 207 stores data written in accordance with control of the FDD 206, and causes the data processing apparatus 101 to read data stored in the FD 207.

A compact-disc read-only memory (CD-ROM), a compact-disc recordable (CD-R), a compact-disc rewritable (CD-RW), a magneto optical (MO) disc, a digital versatile disc (DVD), and a memory card may be used as a removable recording medium besides the FD 207. The display 208 displays not only a cursor, an icon, and a tool box, but also data such as documents, images, information of functions, etc. For example, a cathode-ray tube (CRT), a thin-film transistor (TFT) display, a plasma display can be employed as the display 208.

The communication I/F 209 is connected to the network 104 such as the Internet via communication lines, and connected to other devices via the communication lines. The communication I/F 209 is an interface between the network 104 and the data processing apparatus 101, and controls input/output from/to an external apparatus. For example, a modem and a local area network (LAN) adapter can be employed as the communication I/F 209.

The input key 210 includes plural keys to input characters, numbers, various instructions, etc. An input pad with a touch panel and a numeric key pad can be employed as the input key 210.

The biological sensor 211 is, for example, a fingerprint sensor 212, a camera 213, or a microphone 214. The fingerprint sensor 212 is a device that detects asperities of a fingerprint at approximately 50 micrometer (μm) interval, and converts the detected asperities into an electric signal. There has been suggested a semiconductor method, an optical method, a pressure-sensitive method, and a thermal method as a method of scanning a fingerprint. The camera 213 is a device that takes a picture of an iris and a retina of an eye. The microphone 214 is a device that detects voice pattern that indicates vocal characteristics.

The security chip 215 is called a trusted platform module (TPM), and installed on a main board of the data processing apparatus 101. The security chip 215 is a dedicated chip that provides a basic function for security and privacy. The security chip 215 is defined in the specification of trusted computing group (TCG). A TPM installed in the data processing apparatus 101 cannot be installed in other data processing apparatus. If the TPM is removed from the data processing apparatus 101, the data processing apparatus 101 cannot run.

The security chip 215 is a data managing device according to an embodiment of the present invention.

Figure 3:
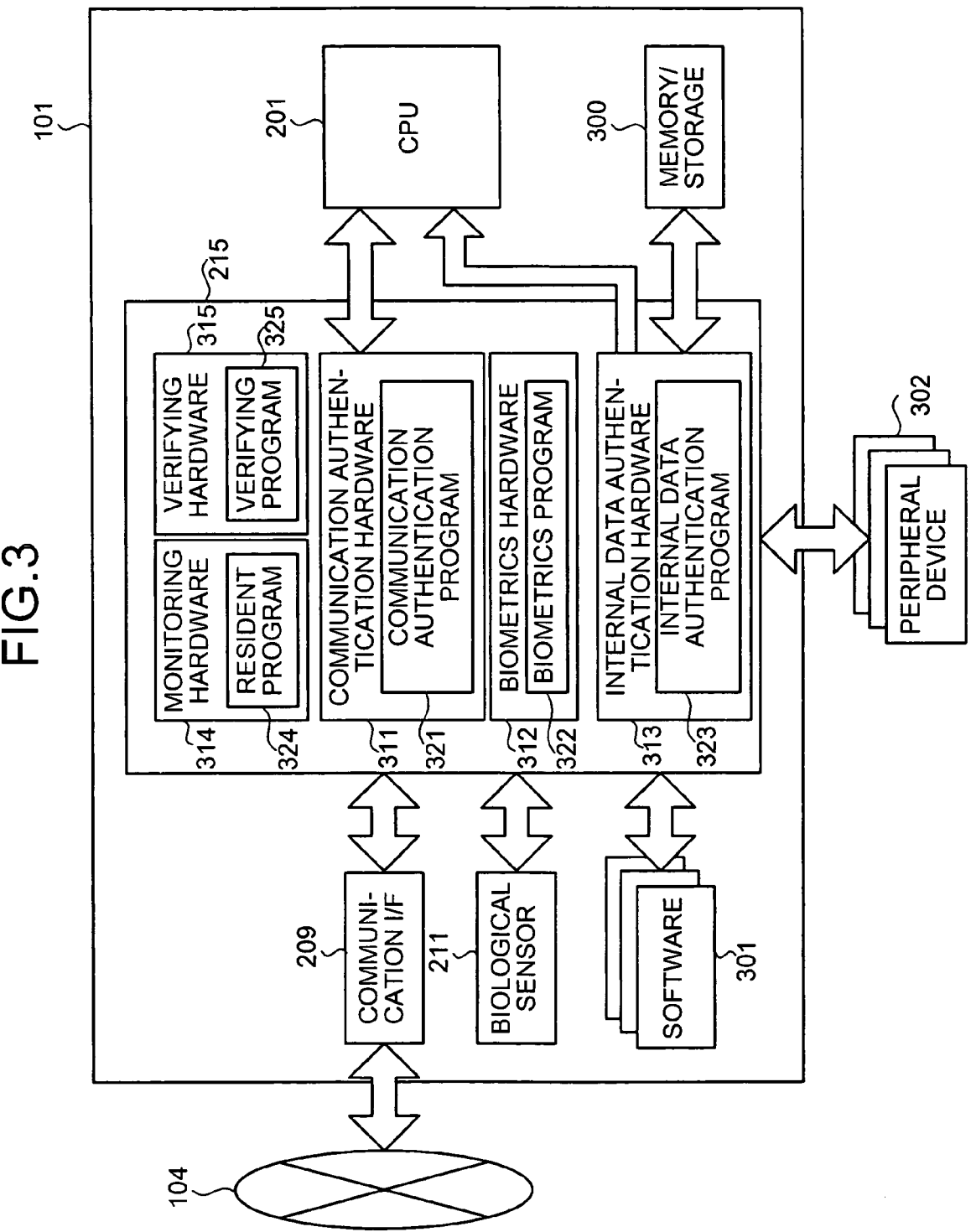
FIG. 3 is a block diagram of a hardware configuration of a security chip.

FIG. 3 is a block diagram of a hardware configuration of the security chip 215. The security chip 215 shown in FIG. 3 is connected to the communication I/F 209, the biological sensor 211, the CPU 201, and a memory/storage 300 via a bus. The security chip 215 can obtain data of various software 301 installed in the data processing apparatus 101, and data of a peripheral device 302 connected to the data processing apparatus 101.

The memory/storage 300 is provided either inside the security chip 215 or outside the security chip 215, as long as the memory/storage 300 is inside the data processing apparatus 101. If the memory/storage 300 is provided inside the security chip 215, it is possible to prevent removal of the memory/storage 300 and falsification of data.

The security chip 215 includes communication authentication hardware 311, biometrics hardware 312, internal-data authentication hardware 313, monitoring hardware 314, and verifying hardware 315.

The communication authentication hardware 311 ensures the security of communication between the data processing apparatus 101 and an external apparatus (for example, the data providing apparatus 102 or the authentication apparatus 103 shown in FIG. 1). For example, the communication authentication hardware 311 determines whether a user of an external apparatus is an authorized person authenticated by a certificate authority, by performing public key infrastructure (PKI) authentication using an electronic certificate issued by the certificate authority. A communication authentication program 321 for communication authentication is installed in the communication authentication hardware 311.

The biometrics hardware 312 determines whether a user of the data processing apparatus 101 is an authorized user by determining whether biological data detected by the biological sensor 211 matches user's biological data registered in the data processing apparatus 101. A biometrics program 322 for biometrics is installed in the biometrics hardware 312.

The internal data authentication hardware 313 authenticates data (internal data) in the data processing apparatus 101 or the single chip. The internal data is called environment data, therefore the internal data authentication hardware 313 is also called environment authentication hardware. The environment data is data of the peripheral device 302 (for example, a name of the device, version data) obtained from the peripheral device 302 connected to the data processing apparatus 101, data of the software 301 (for example, a name of the software, version data) installed in the data processing apparatus 101, or various data (for example, an electronic certificate) stored in the memory/storage 300.

The internal data authentication hardware 313 keeps data stored in the memory/storage 300 secret. For example, the internal data authentication hardware 313 encrypts obtained data using a unique encryption key, and stores the encrypted data in the memory/storage 300. When requested from other hardware, the internal data authentication hardware 313 decrypts the encrypted data stored in the memory/storage 300 using a unique decryption key that is a pair of the encryption key. The internal data authentication hardware 313 can confirm that internal data is not falsified in the data processing apparatus 101 by the encryption and the decryption. The internal data authentication program 323 for the processing described above is installed in the internal data authentication hardware 313.

A resident program 324 is installed in the monitoring hardware 314. The monitoring hardware 314 monitors transfer of data in the data managing device. Details of the monitoring processing will be explained later.

A verifying program 325 is installed in the verifying hardware 315. The verifying hardware 315 verifies validity of data input into the security chip 215 from an external apparatus, when security of communication between the data processing apparatus and the external apparatus is ensured by the communication authentication hardware 311. Details of the verifying processing will be explained later.

Figure 4:
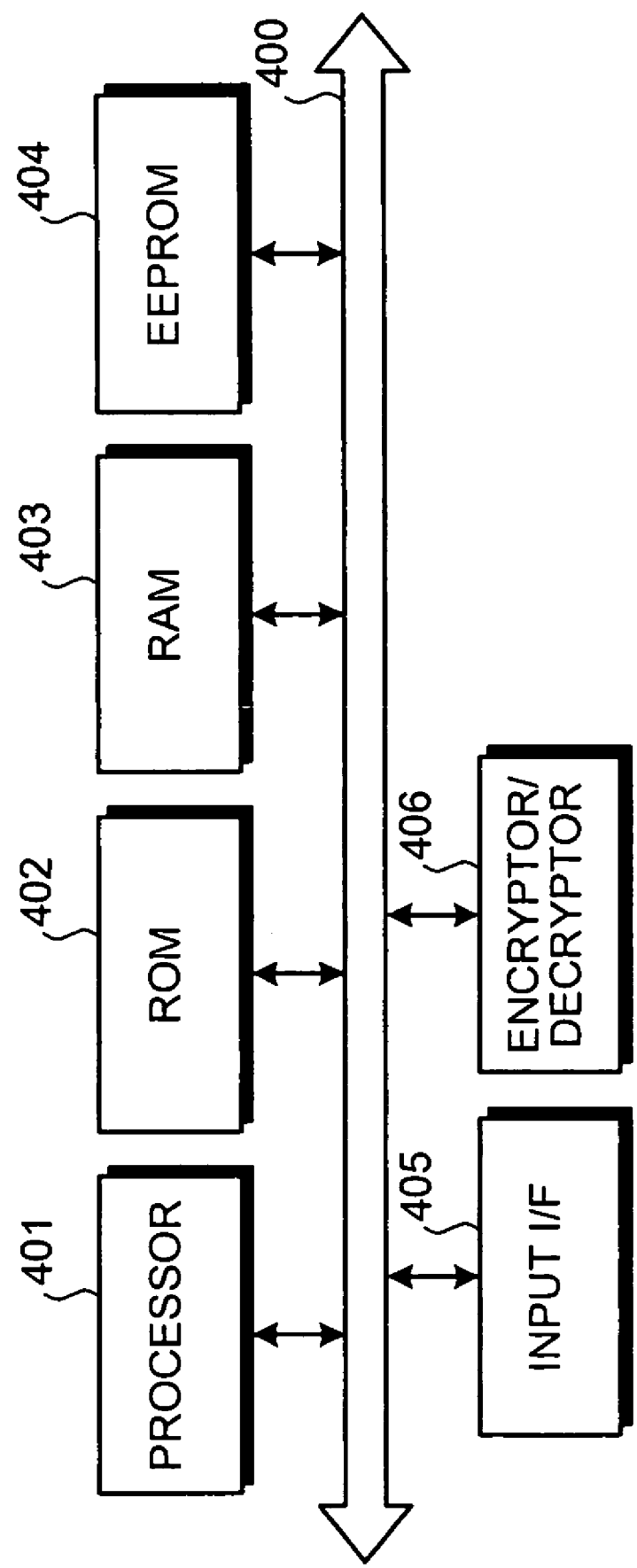
FIG. 4 is a block diagram of a configuration of each hardware shown in FIG. 3.

FIG. 4 is a block diagram of a configuration of each of the hardware 311 to 315 shown in FIG. 3. Each of the hardware 311 to 315 shown in FIG. 4 includes a processor 401, a ROM 402, a RAM 403, an electronically erasable and programmable read only memory (EEPROM) 404, an input I/F 405, and an encryptor/decryptor 406. The units 401 to 406 are connected via a bus 400.

The processor 401 controls the entire hardware 311 to 315. The ROM 402 stores a program such as a boot program. The RAM 403 is used as a work area of the processor 401. The EEPROM 404 stores a program performed by each of the hardware 311 to 315. The encryptor/decryptor 406 performs generation of an asymmetric encryption key, encryption, decryption, generation of a message digest (a hash value), and generation of an electronic signature.

Figures 5, 6:
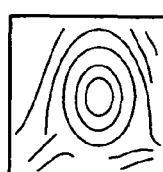
FIG. 5 is a diagram of electronic certificates stored in a memory/storage.
FIG. 6 is a diagram of biological data stored in a memory/storage.

FIG. 5 is a diagram of electronic certificates stored in the memory/storage 300. FIG. 6 is a diagram of biological data stored in the memory/storage 300. FIG. 7 is a diagram of internal data stored in the memory/storage 300.

As shown in FIG. 5, each of electronic certificates Ca to Cz is stored corresponding to each authorized person. "An authorized person" means a person authenticated by each of the electronic certificates Ca to Cz, for example, a user, a maker, a vendor, and a certificate authority. Each of the electronic certificates Ca to Cz includes version data, a signature algorithm, a name of an issuer, an expiration date, a public key, and related information. Each of the electronic certificates Ca to Cz is encrypted by the internal data authentication hardware 313.

As shown in FIG. 6, registration data 600 includes a name of a registrant 601, a sensor type 602, and a biological data 603. FIG. 6 is an example of the registration data 600, when a registrant "X" that is a user of the data processing apparatus 101 registers, as the biological data 603, image data "Xa" of a fingerprint of the registrant "X" detected by "a fingerprint sensor". The registration data 600 is also encrypted by the internal data authentication hardware 313.

As shown in FIG. 7, the peripheral device 302, the software 301, a name and a version of an execution program such as a communication authentication program 321 installed in each hardware, are stored as the internal data.

Figure 8:
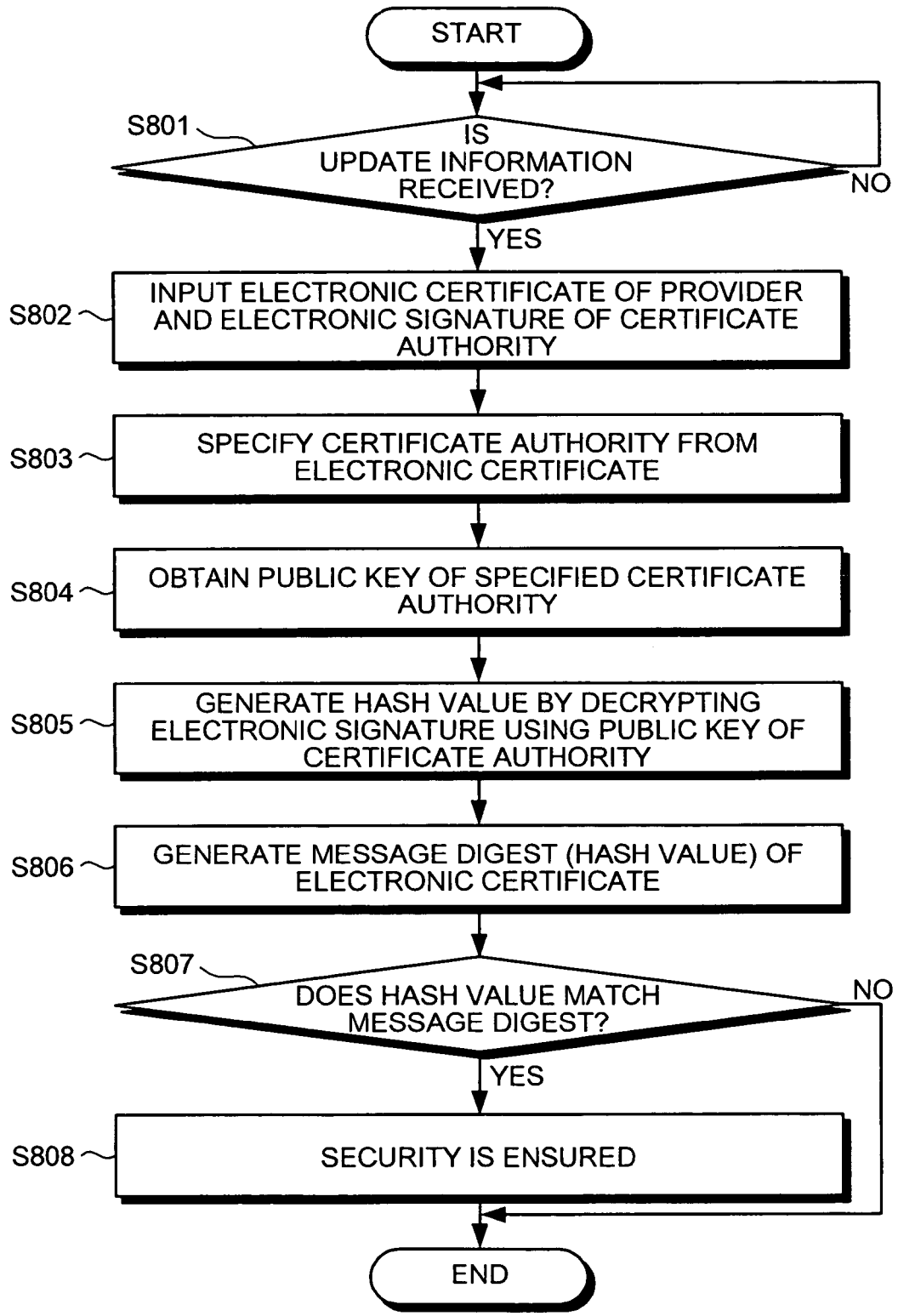
FIG. 8 is a flowchart of a procedure of communication authentication performed by a data managing device.

FIG. 8 is a flowchart of a procedure of communication authentication performed by a data managing device (the security chip 215) according to an embodiment of the present invention.

Figure 9:
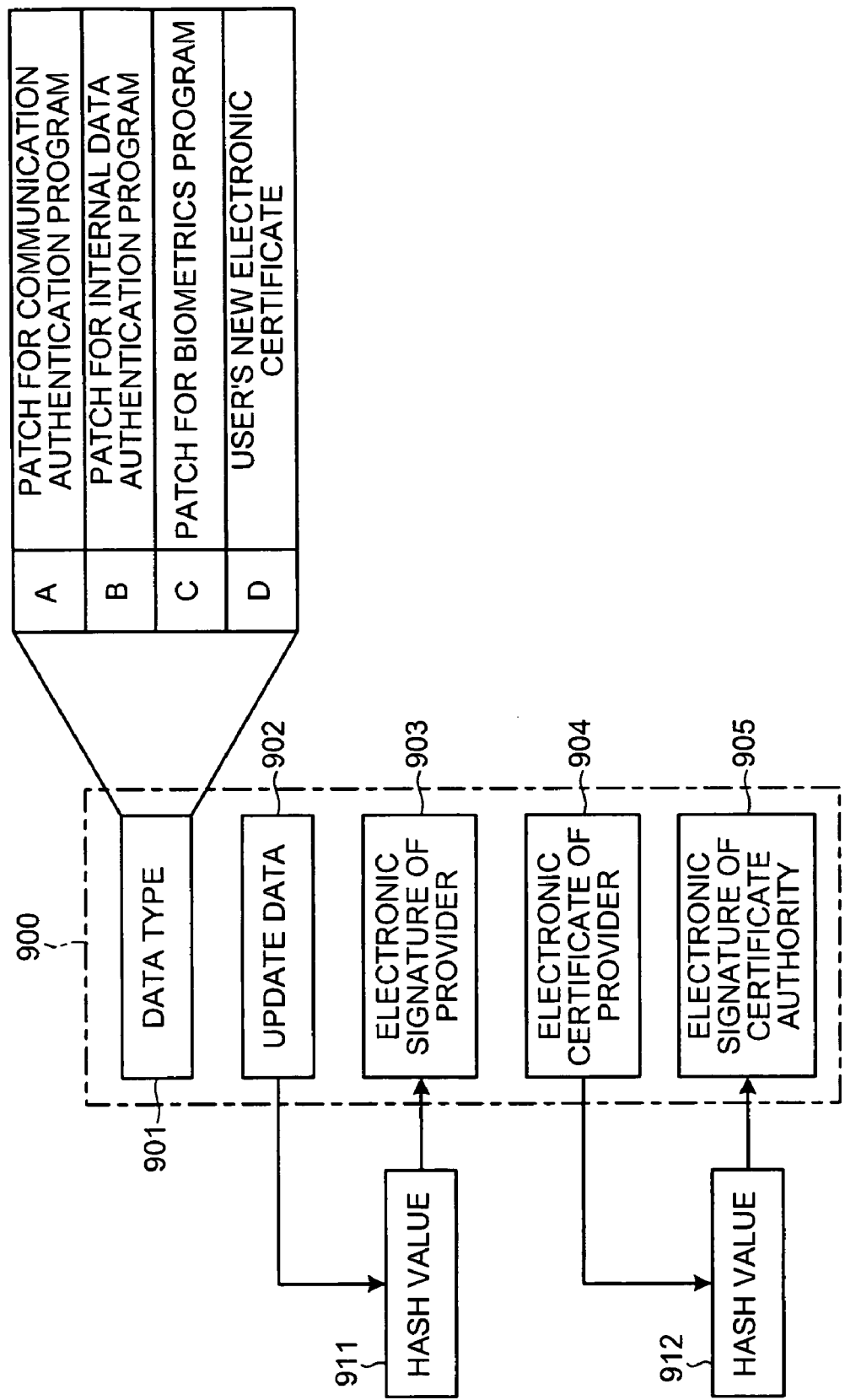
FIG. 9 is a diagram of update information.

At first, whether the communication I/F 209 receives update information is determined (Step S801). FIG. 9 is a diagram of the update information.

As shown in FIG. 9, update information 900 includes data type 901, update data 902, an electronic signature 903 of a provider, an electronic certificate 904 of the provider (an electronic certificate of a certificate authority when the provider is the certificate authority), and an electronic signature 905 of the certificate authority. The data type 901 is data that indicates contents of the update data 902.

For example, when the data type 901 is "A", the update data 902 is "a patch for the communication authentication program 321". When the data type 901 is "B", the update data 902 is "a patch for the internal data authentication program 323". When the data type 901 is "C", the update data 902 is "a patch for the biometrics program 322". When the data type 901 is "D", the update data 902 is "a user's new electronic certificate".

Thus, the update data 902 is a patch or an electronic certificate. The electronic signature 903 of the provider is attached to the update data 902. The electronic signature 903 of the provider is a hash value 911 of the update data 902 encrypted at the provider using a secret key of the provider.

The electronic certificate 904 is a certificate issued by an arbitrary certificate authority. The electronic signature 905 of a certificate authority is attached to the electronic certificate 904. The electronic signature 905 of a certificate authority is a hash value 912 of the electronic certificate 904 encrypted at the certificate authority using a secret key of the certificate authority.

Figure 10:
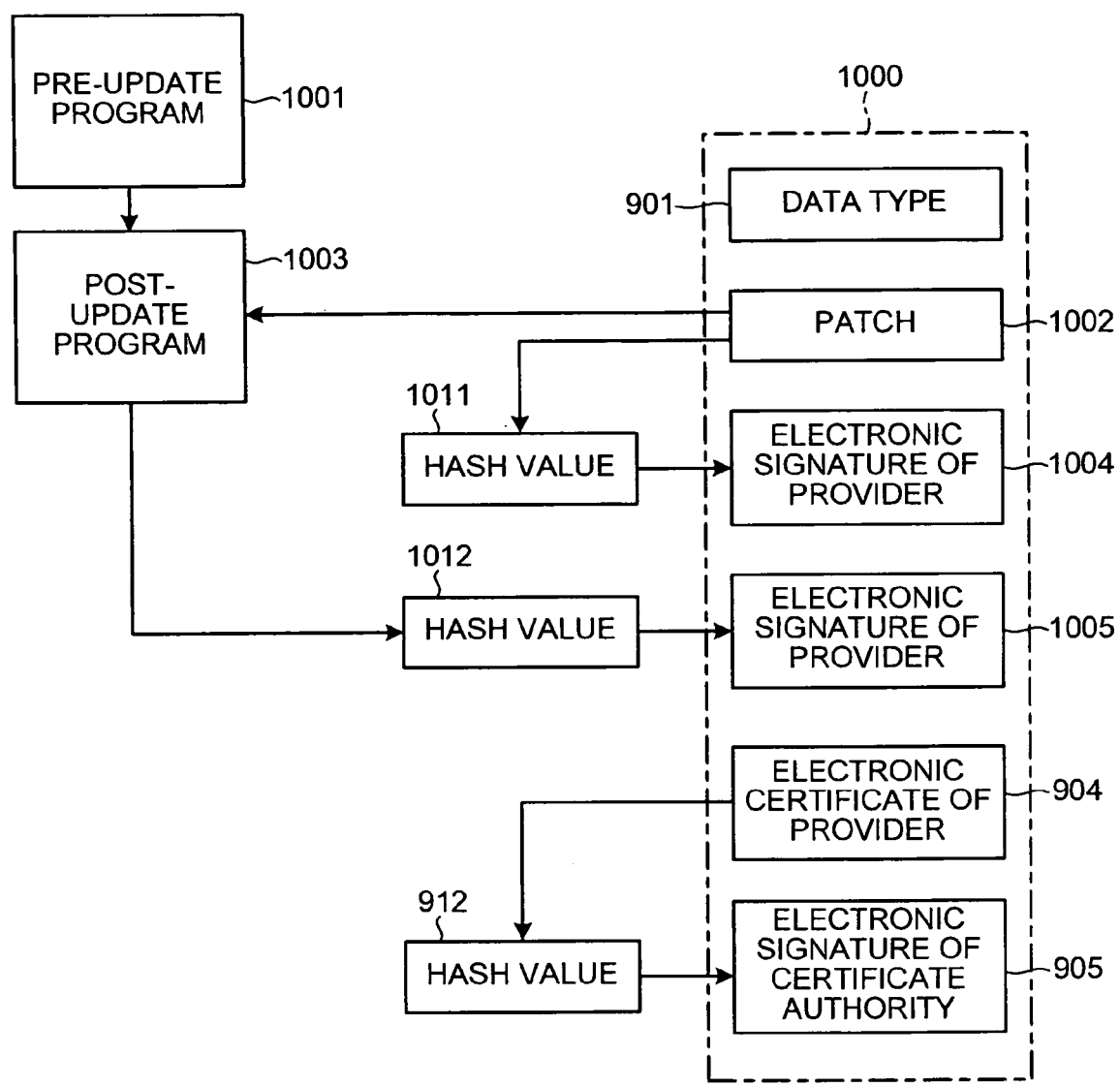
FIG. 10 is a diagram of update information when the data type is any one of A to C.

Update information when the data type 901 is any one of A to C will be explained. FIG. 10 is a diagram of update information when the data type is any one of A to C.

As shown in FIG. 10, a pre-update program 1001 and a patch 1002 are programs generated by a provider such as a maker and a vendor. A post-update program 1003 is also a program generated by the provider such as a maker and a vendor, that is the pre-update program 1001 updated (modified) by the patch 1002.

The electronic signature 1004 of a provider is a hash value 1011 of the patch 1002 encrypted by a secret key of the provider. Update information 1000 may include an electronic signature 1005 besides the electronic signature 1004. The electronic signature 1005 is a hash value 1012 of the post-update program 1003 encrypted by the secret key of the provider.

Figure 11:
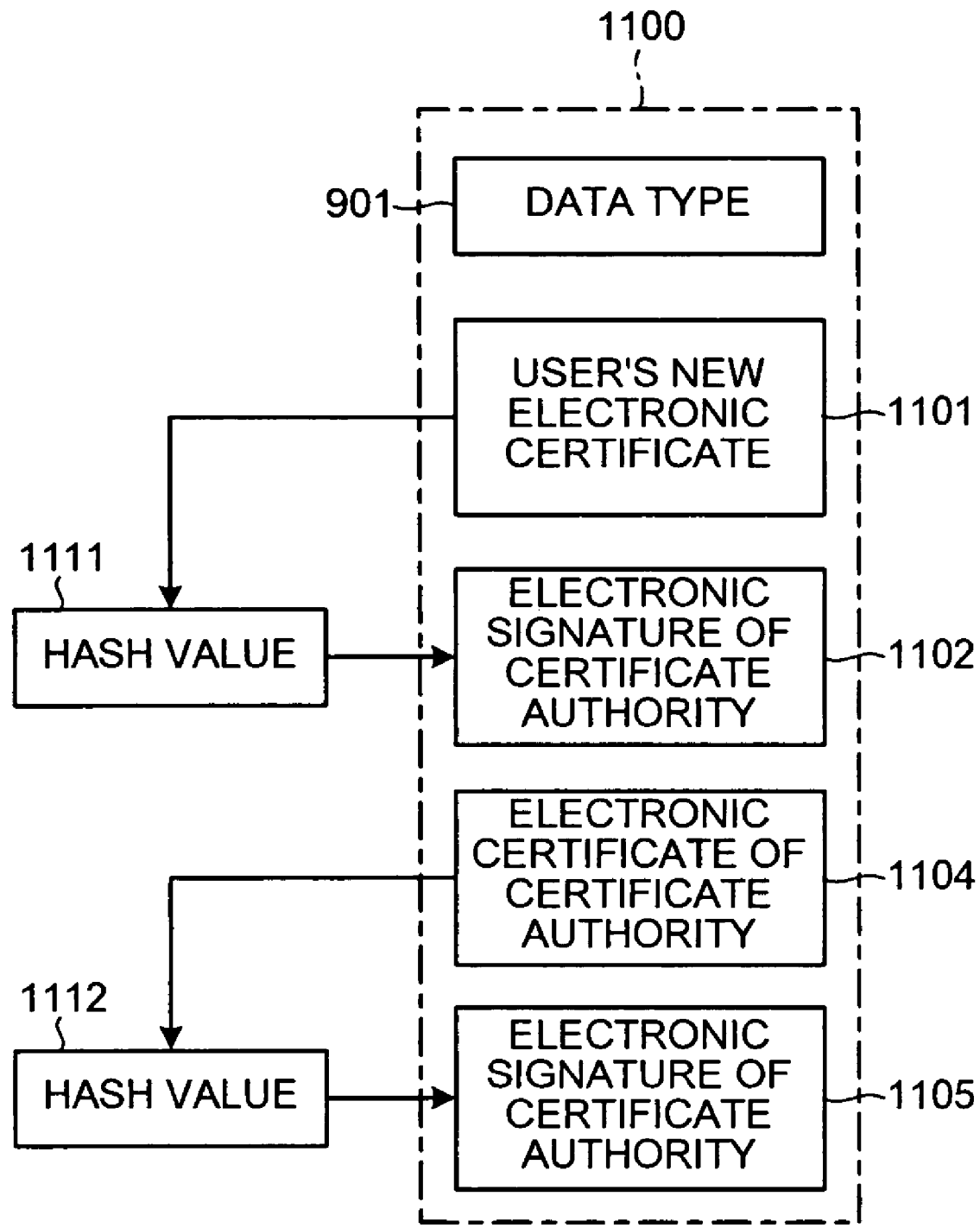
FIG. 11 is a diagram of update information when the data type is D.

Update information when the data type 901 is D will be explained. FIG. 11 is a diagram of update information when the data type is D. The update information 1100 includes a user's new electronic certificate 1101 issued by a certificate authority. For example, the update data 1101 is update data issued by the authentication apparatus 103 of the certificate authority right after an expiration date of a current certificate is expired. The update data 1101 may be an electronic certificate newly issued to the user.

An electronic signature 1102 of the certificate authority is a hash value 1111 of the user's new electronic certificate 1101 encrypted by the secret key of the certificate authority. An electronic certificate 1104 is issued by the certificate authority or another certificate authority. An electronic signature 1105 of a certificate authority is a hash value 1112 of the electronic certificate 1104 encrypted by the secret key of the certificate authority that issues the electronic certificate 1104.

As shown in FIG. 8, when the update information 900 (or 1000, 1100) is received (Step S801: YES), the electronic certificate 904 of the provider (or the electronic certificate 1104 of the certificate authority) and the electronic signature 905 (or 1105) of the certificate authority are input into the communication authentication hardware 311 via the communication I/F 209 (Step S802). Note that the communication I/F 209 may communicate with the certificate authority that issues the electronic certificate 904 (or the electronic certificate 1104) and verify whether the electronic certificate 904 (or the electronic certificate 1104) is currently valid. Thus, it is possible to improve security of the communication.

Then, the communication authentication hardware 311 extracts a name of the certificate authority included in the input electronic certificate 904 of the provider (or the electronic certificate 1104 of the certificate authority), to specify the certificate authority that has issued the electronic certificate 904 (or 1104) (Step S803).

The communication authentication hardware 311 outputs the specified certificate authority to the internal data authentication hardware 313. The internal data authentication hardware 313 extracts an electronic certificate of the certificate authority specified by the communication authentication hardware 311 from electronic certificates that are encrypted and stored in the memory/storage 300. Then, the internal data authentication hardware 313 decrypts the extracted electronic certificate by a decryption key of the internal data authentication hardware 313, and obtains a public key of the specified certificate authority (Step S804). A successful decryption of the public key indicates that data in the memory/storage 300 is not falsified, and that security is ensured.

The obtained public key of the certificate authority is output to the communication authentication hardware 311. The communication authentication hardware 311 generates a hash value by decrypting the electronic signature 905 (or 1105) of the certificate authority using the obtained public key of the certificate authority (Step S805). The communication authentication hardware 311 also generates a message digest (a hash value) of the input electronic certificate of the provider (the electronic certificate of the certificate authority) (Step S806).

Then, the communication authentication hardware 311 determines whether the hash value generated at Step S805 matches the message digest generated at Step S806 (Step S807). When the hash value matches the message digest (Step S807: YES), security of the communication with the provider (or the certificate authority) is ensured (Step S808), and a communication line with high security is established. On the other hand, when the hash value does not match the message digest (Step S807: NO), the communication with the provider (or the certificate authority) is prohibited because the security of the communication cannot be ensured.

Figure 12:
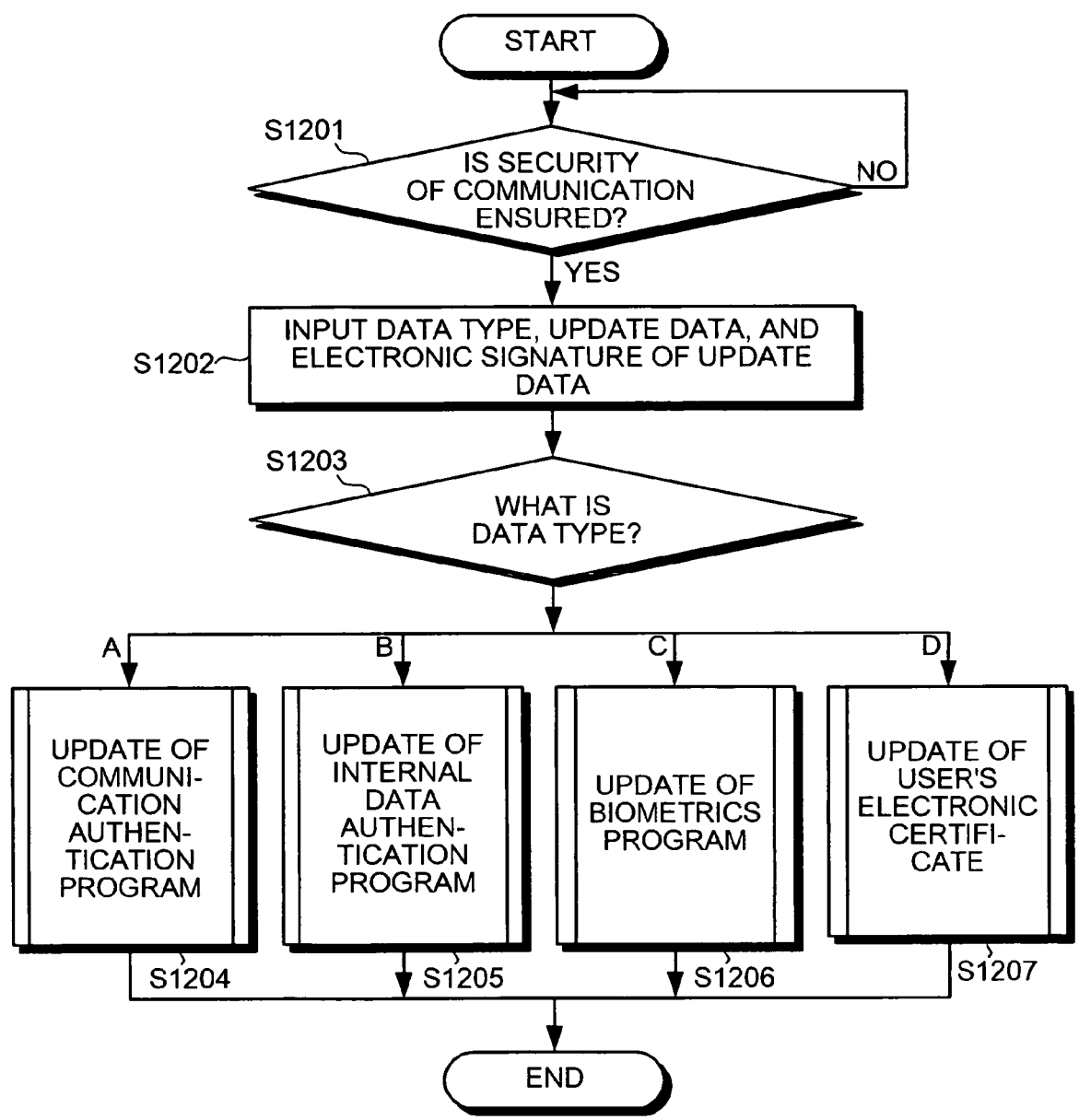
FIG. 12 is a flowchart of a procedure of updating a security chip when the security of communication is ensured by communication authentication hardware.

FIG. 12 is a flowchart of a procedure of updating the security chip when the security of communication is ensured by the communication authentication hardware 311.

As shown in FIG. 12, when security of communication is ensured (Step S1201: YES), the data type 901, the update data 902, and the electronic signature 903 of the update data 902 received by the communication I/F 209 are input into the monitoring hardware 314 (Step S1202).

Then, the monitoring hardware 314 refers to the input data type 901. When the data type 901 is "A" (Step S1203: A), in other words, when the update data 902 is determined to be the patch 1002 for the communication authentication program 321, an update of the communication authentication program 321 is performed (Step S1204).

When the data type 901 is "B" (Step S1203: B), in other words, when the update data 902 is determined to be the patch 1002 for the internal data authentication program 323, an update of the internal data authentication program 323 is performed (Step S1205).

When the data type 901 is "C" (Step S1203: C), in other words, when the update data 902 is determined to be the patch 1002 for the biometrics program 322, an update of the biometrics program 322 is performed (Step S1206).

When the data type 901 is "D" (Step S1203: D), in other words, when the update data 902 is determined to be the user's new electronic certificate 1101, an update of the user's electronic certificate is performed (Step S1207).

Figure 13:
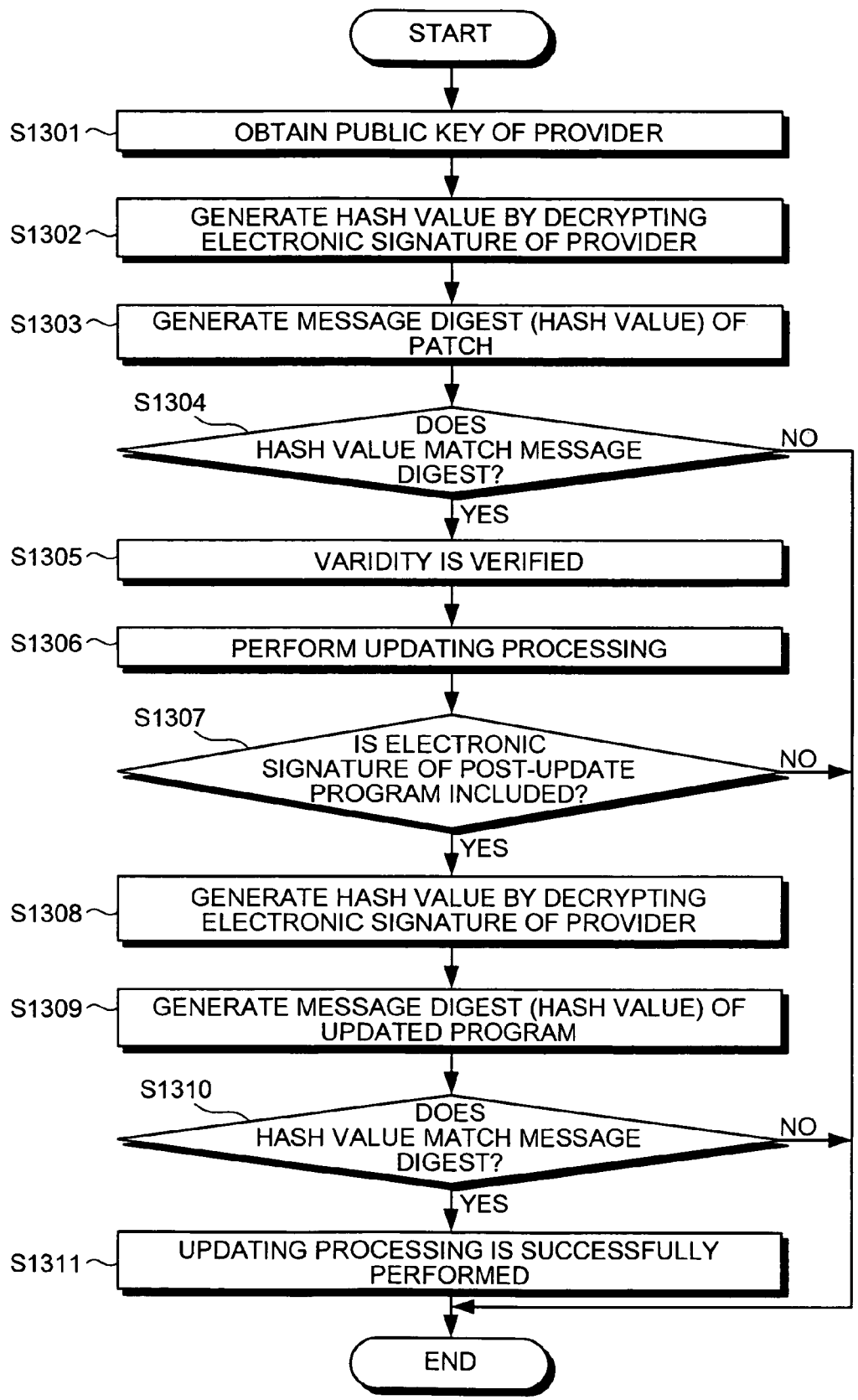
FIG. 13 is a flowchart of a procedure of updating a communication authentication program or an internal data authentication program.

FIG. 13 is a flowchart of a procedure of updating the communication authentication program 321 or the internal data authentication program 323.

As shown in FIG. 13, the monitoring hardware 314 obtains a public key of the provider that has provided the patch (Step S1301). For example, the monitoring hardware 314 orders the internal data authentication hardware 313 to obtain the public key of the provider. The internal data authentication hardware 313 extracts an electronic certificate of the provider from electronic certificates that are encrypted and stored in the memory/storage 300.

Then, the internal data authentication hardware 313 decrypts the extracted electronic certificate by the decryption key of the internal data authentication hardware 313, and extracts the public key from the decrypted electronic certificate. The internal data authentication hardware 313 outputs the extracted public key to the monitoring hardware 314.

Then, the monitoring hardware 314 generates a hash value by decrypting an electronic signature of the provider using the obtained public key of the provider (Step S1302). The monitoring hardware 314 also generates a message digest (a hash value) of the patch (Step S1303). Then, the monitoring hardware 314 outputs to the verifying hardware 315, the hash value generated at Step S1302 and the message digest generated at Step S1303.

The verifying hardware 315 determines whether the hash value generated at Step S1302 matches the message digest generated at Step S1303 (Step S1304). When the hash value does not match the message digest (Step S1304: NO), a series of the processing ends there without performing the updating processing, because the patch might be falsified.

On the other hand, when the hash value matches the message digest (Step S1304: YES), the patch is verified to be valid (in other words, not to be falsified) (Step S1305). Then, the update of the communication authentication program 321 or the internal data authentication program 323 using the verified patch is performed (Step S1306).

The monitoring hardware 314 determines whether the electronic signature 1005 of the post-update program 1003 is included in the input update information (Step S1307). When the electronic signature 1005 of the post-update program 1003 is not included (Step S1307: NO), a series of the processing ends there.

On the other hand, when the electronic signature 1005 of the post-update program 1003 is included (Step S1307: YES), the monitoring hardware 314 generates a hash value by decrypting the electronic signature 1005 using the public key obtained at Step S1301 (Step S1308).

The monitoring hardware 314 also generates a message digest (a hash value) of the communication authentication program 321 or the internal data authentication program 323 updated by the updating processing at Step S1306 (Step S1309). Then, the monitoring hardware 314 outputs to the verifying hardware 315, the hash value generated at Step S1308 and the message digest generated at Step S1309.

The verifying hardware 315 determines whether the hash value generated at Step S1308 matches the message digest generated at Step S1309 (Step S1310). When the hash value does not match the message digest (Step S1310: NO), a series of the processing ends there because the program is not successfully updated. On the other hand, when the hash value matches the message digest (Step S1310: YES), it is verified that the updated communication authentication program 321 or the updated internal data authentication program 323 is equal to the post-update program 1003 of the provider, and therefore the program is successfully updated (Step S1311).

Thus, with the patch and the electronic signature and without downloading the entire, bulky post-update program 1003 from the provider, it can be confirmed whether the program is successfully updated, thereby enabling a safe and speedy authentication.

Figure 14:
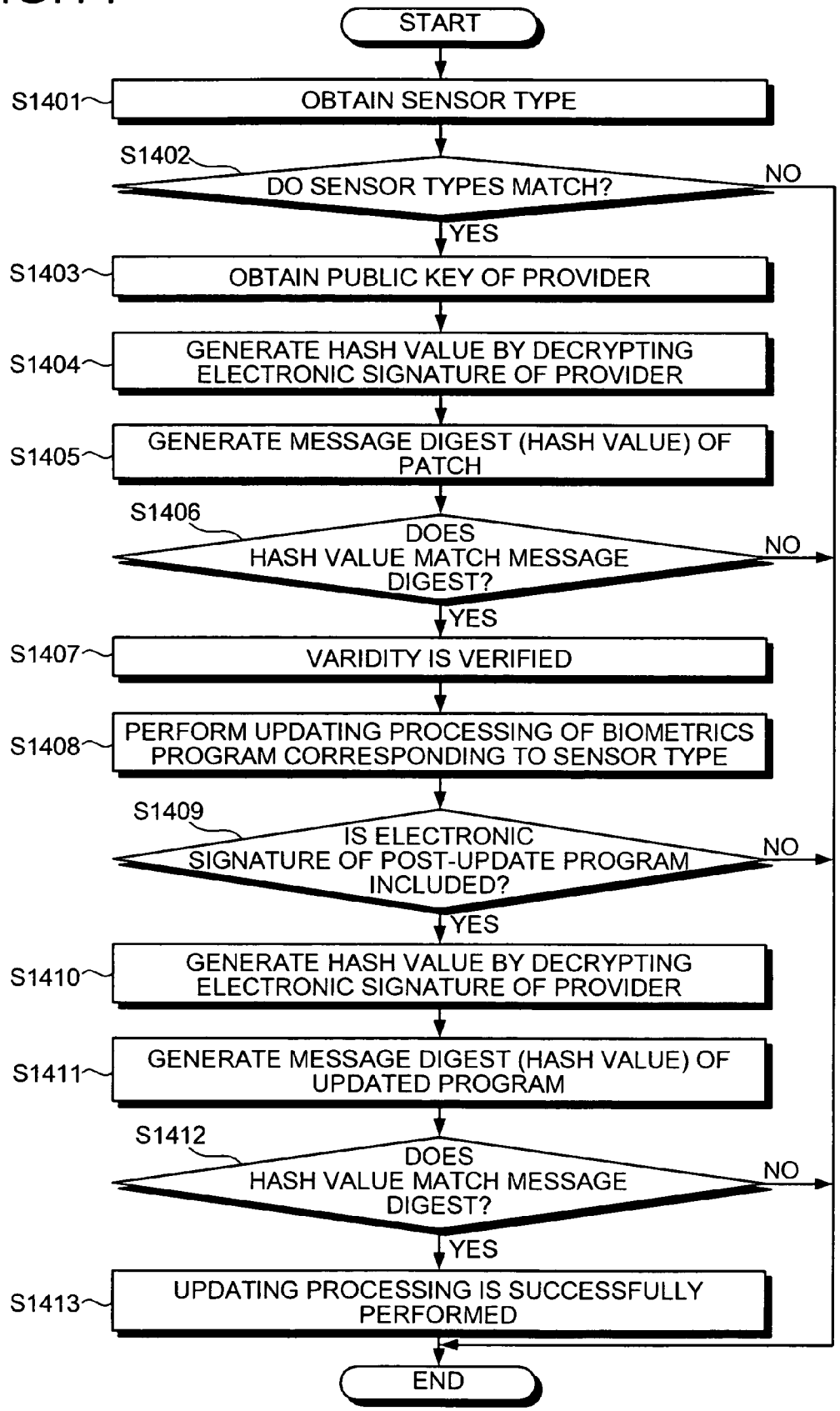
FIG. 14 is a flowchart of a procedure of updating a biometrics program.

FIG. 14 is a flowchart of a procedure of updating the biometrics program 322. As shown in FIG. 14, the internal data authentication hardware 313 obtains a sensor type of the biological sensor 211 designated by a user (Step S1401), and notifies the monitoring hardware 314 of the obtained sensor type.

The monitoring hardware 314 determines whether a sensor type of the biometrics program 322 to be updated by the patch in the input update information matches the sensor type notified by the internal data authentication hardware 313 (Step S1402).

When the former sensor type does not match the later sensor type (Step S1402: NO), a series of the processing ends there because the latter sensor type does not correspond to the biometrics designated by the user. On the other hand, when the former sensor type matches the latter sensor type (Step S1402: YES), the monitoring hardware 314 obtains a public key of a provider that has provided the patch (Step S1403). For example, the monitoring hardware 314 orders the internal data authentication hardware 313 to obtain the public key of the provider. The internal data authentication hardware 313 extracts an electronic certificate of the provider from electronic certificates that are encrypted and stored in the memory/storage 300.

Then, the internal data authentication hardware 313 decrypts the extracted electronic certificate by the decryption key of the internal data authentication hardware 313, and extracts the public key from the decrypted electronic certificate. The internal data authentication hardware 313 outputs the extracted public key to the monitoring hardware 314.

Then, the monitoring hardware 314 generates a hash value by decrypting the electronic signature of the provider using the obtained public key of the provider (Step S1414). The monitoring hardware 314 also generates a message digest (a hash value) of the patch (Step S1405). Then, the monitoring hardware 314 outputs to the verifying hardware 315, the hash value generated at Step S1404 and the message digest generated at Step S1405.

The verifying hardware 315 determines whether the hash value generated at Step S1404 matches the message digest generated at Step S1405 (Step S1406). When the hash value does not match the message digest (Step S1406: NO), a series of the processing ends there without performing the updating processing, because the patch might be falsified.

On the other hand, when the hash value matches the message digest (Step S1406: YES), the patch is verified to be valid (in other words, not to be falsified) (Step S1407). Then, the update of the biometrics program 322 using the verified patch is performed (Step S1408).

The monitoring hardware 314 determines whether the electronic signature 1005 of the post-update program 1003 is included in the input update information (Step S1409). When the electronic signature 1005 of the post-update program 1003 is not included (Step S1409: NO), a series of the processing ends there.

On the other hand, when the electronic signature 1005 of the post-update program 1003 is included (Step S1409: YES), the monitoring hardware 314 generates a hash value by decrypting the electronic signature 1005 using the public key obtained at Step S1403 (Step S1410).

The monitoring hardware 314 generates a message digest (a hash value) of the biometrics program 322 updated by the updating processing at Step S1408 (Step S1411). Then, the monitoring hardware 314 outputs to the verifying hardware 315, the hash value generated at Step S1410 and the message digest generated at Step S1411.

The verifying hardware 315 determines whether the hash value generated at Step S1410 matches the message digest generated at Step S1411 (Step S1412). When the hash value matches the message digest (Step S1412: YES), it is verified that the updated biometrics program 322 is equal to the post-update program 1003 of the provider, and therefore the biometrics program 322 is successfully updated (Step S1413). On the other hand, when the hash value does not match the message digest (Step S1412: NO), a series of the processing ends there because the biometrics program 322 is not successfully updated.

Figure 15:
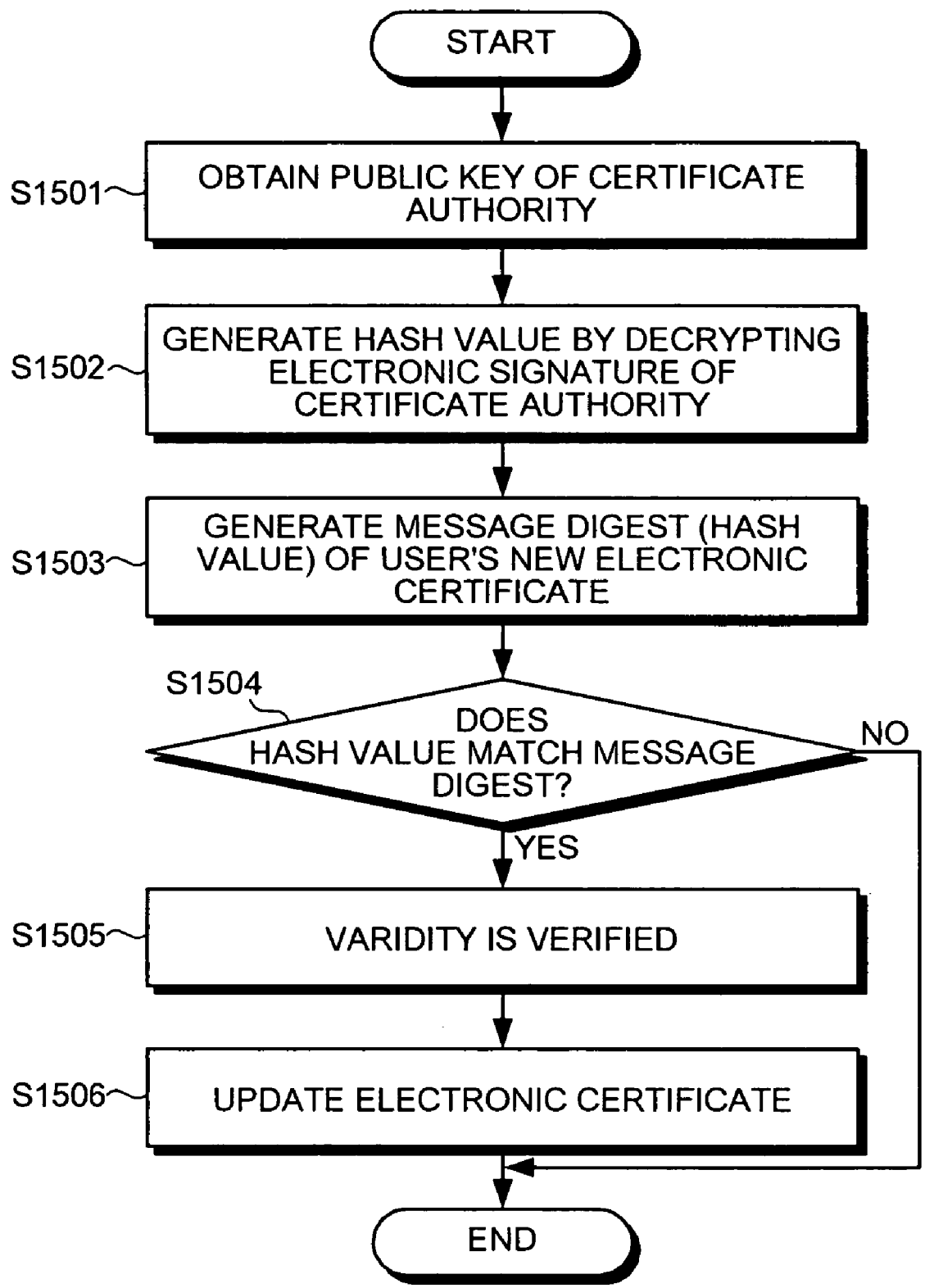
FIG. 15 is a flowchart of a procedure of updating a user's electronic certificate.

FIG. 15 is a flowchart of a procedure of updating the user's electronic certificate. As shown in FIG. 15, the monitoring hardware 314 obtains a public key of a certificate authority that has issued the user's new electronic certificate 1101 (Step S1501). For example, the monitoring hardware 314 extracts, from the electronic certificate 1101, a name of the certificate authority that has issued the electronic certificate 1101, to specify the certificate authority. The monitoring hardware 314 orders the internal data authentication hardware 313 to obtain a public key of the specified certificate authority. The internal data authentication hardware 313 extracts an electronic certificate of the specified certificate authority from electronic certificates that are encrypted and stored in the memory/storage 300.

Then, the internal data authentication hardware 313 decrypts the extracted electronic certificate by the decryption key of the internal data authentication hardware 313, and extracts the public key from the decrypted electronic certificate. The internal data authentication hardware 313 outputs the extracted public key to the monitoring hardware 314.

Then, the monitoring hardware 314 generates a hash value by decrypting the electronic signature 1102 of the certificate authority using the obtained public key of the certificate authority (Step S1502). The monitoring hardware 314 also generates a message digest (a hash value) of the electronic certificate 1101 (Step S1503). Then, the monitoring hardware 314 outputs to the verifying hardware 315, the hash value generated at Step S1502 and the message digest generated at Step S1503.

The verifying hardware 315 determines whether the hash value generated at Step S1502 matches the message digest generated at Step S1503 (Step S1504). When the hash value does not match the message digest (Step S1504: NO), a series of the processing ends there without performing the updating processing, because the electronic certificate 1101 might be falsified.

On the other hand, when the hash value matches the message digest (Step S1504: YES), the electronic certificate 1101 is verified to be valid (in other words, not to be falsified) (Step S1505). Then, the user's current electronic certificate is updated to the verified electronic certificate (Step S1506).

Thus, the user's electronic certificate, an expiration date of which is expired, can be safely and speedily updated.

Figure 16:
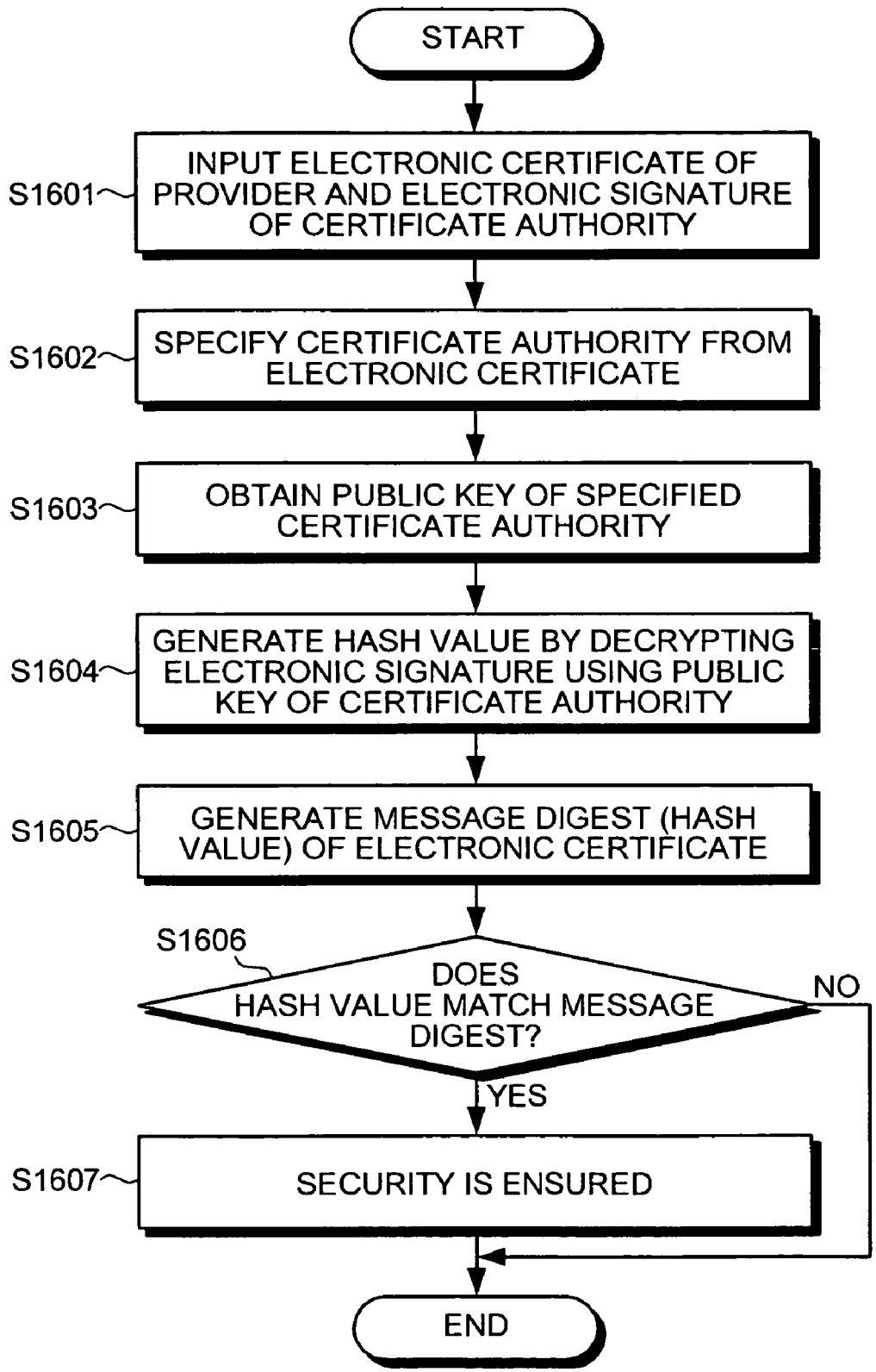
FIG. 16 is a flowchart of a procedure of communication authentication performed before the registration of biological data to a data processing apparatus.

FIG. 16 is a flowchart of a procedure of communication authentication performed before the registration of biological data.

Figure 17:
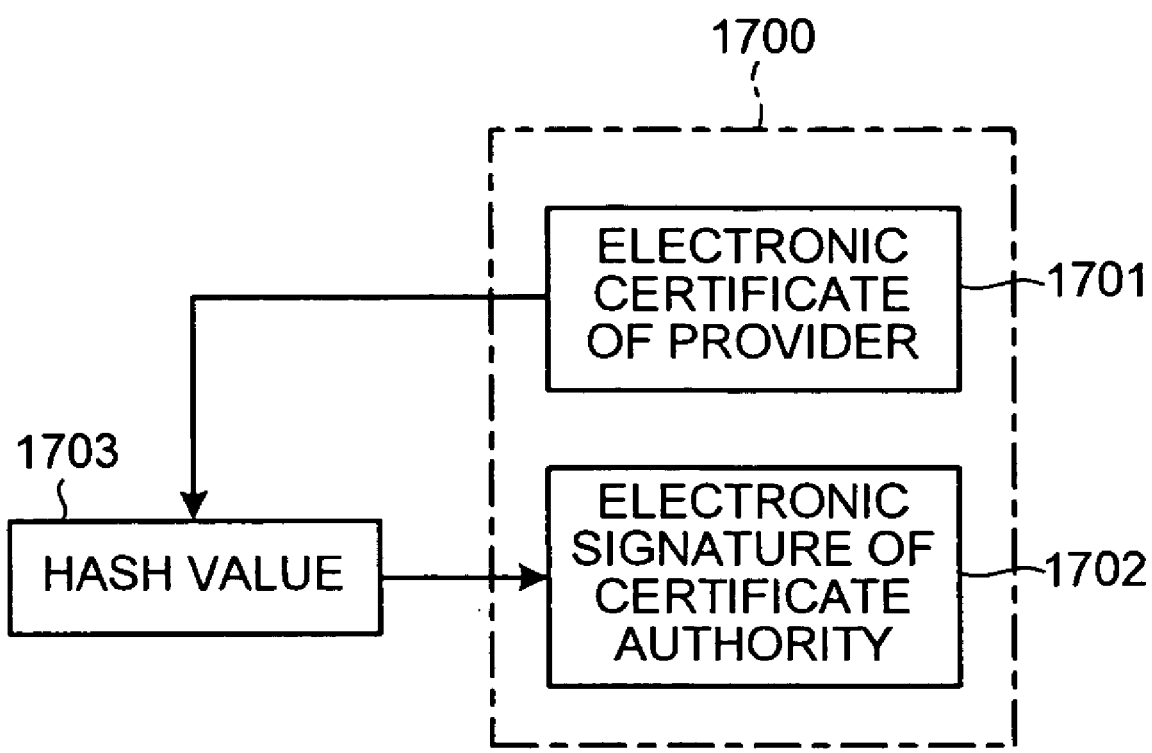
FIG. 17 is a diagram of input data.

As shown in FIG. 16, the communication authentication hardware 311 receives, via the communication I/F 209, an electronic certificate of a provider that has provided an electronic registration instruction, and an electronic signature of the electronic certificate generated by a certificate authority that has authenticated the electronic certificate (Step S1601). FIG. 17 is a diagram of input data input at Step S1601. Input data 1700 shown in FIG. 17 includes an electronic certificate 1701 of a provider that has provided an electronic registration instruction, and an electronic signature 1702 of a certificate authority that has authenticated the electronic certificate 1701. The electronic signature 1702 is a hash value 1703 of the electronic certificate 1701 encrypted by a secret key of the certificate authority.

As shown in FIG. 16, the communication authentication hardware 311 extracts a name of the certificate authority from the electronic certificate 1701, to specify the certificate authority that has issued the electronic certificate 1701 (Step S1602).

The communication authentication hardware 311 outputs the specified certificate authority to the internal data authentication hardware 313. The internal data authentication hardware 313 extracts an electronic certificate of the certificate authority specified by the communication authentication hardware 311 from electronic certificates that are encrypted and stored in the memory/storage 300. Then, the internal data authentication hardware 313 decrypts the extracted electronic certificate by the decryption key of the internal data authentication hardware 313, and obtains a public key of the specified certificate authority (Step S1603). A successful decryption of the public key indicates that data in the memory/storage 300 is not falsified, and that security is ensured.

The obtained public key of the certificate authority is output to the communication authentication hardware 311. The communication authentication hardware 311 generates a hash value by decrypting the electronic signature of the certificate authority 1702 using the obtained public key of the certificate authority (Step S1604). The communication authentication hardware 311 also generates a message digest (a hash value) of the input electronic certificate 1701 of the provider (Step S1605).

Then, the communication authentication hardware 311 determines whether the hash value generated at Step S1604 matches the message digest generated at Step S1605 (Step S1606). When the hash value matches the message digest (Step S1606: YES), security of the communication with the certificate authority is ensured (Step S1607), and a communication line with high security is established. On the other hand, when the hash value does not match the message digest (Step S1606: NO), the communication with the certificate authority is prohibited because the security of the communication cannot be ensured.

Figure 18:
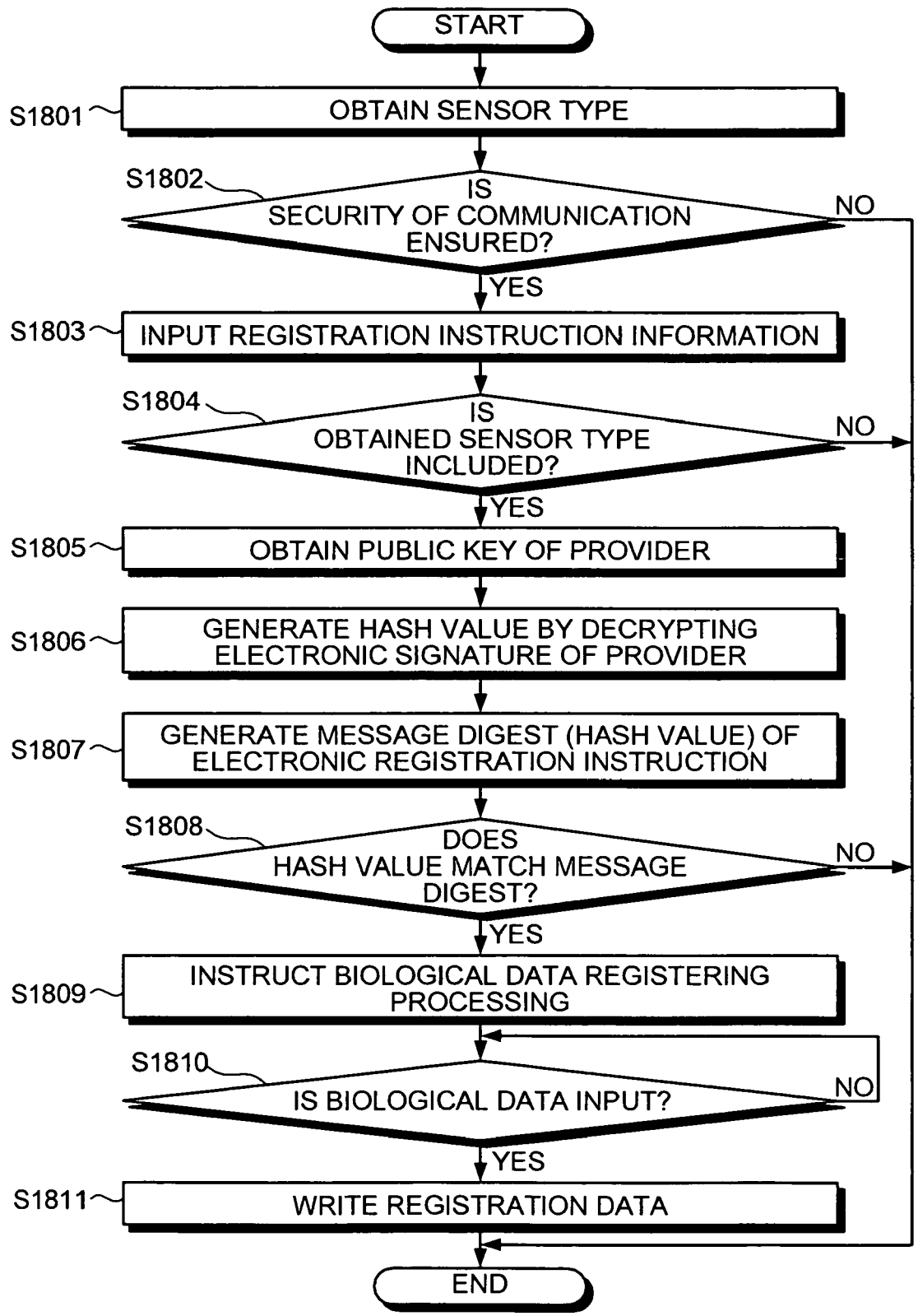
FIG. 18 is a flowchart of a procedure of registering biological data.

FIG. 18 is a flowchart of a procedure of registering biological data. As shown in FIG. 18, at first, a sensor type of the biological sensor 211 designated by a user is obtained (Step S1801). When security of the communication has been ensured at the communication authentication shown in FIG. 16 (Step S1802: YES), registration instruction information is input into the monitoring hardware 314 via the communication I/F 209 (Step S1803).

Figure 19:
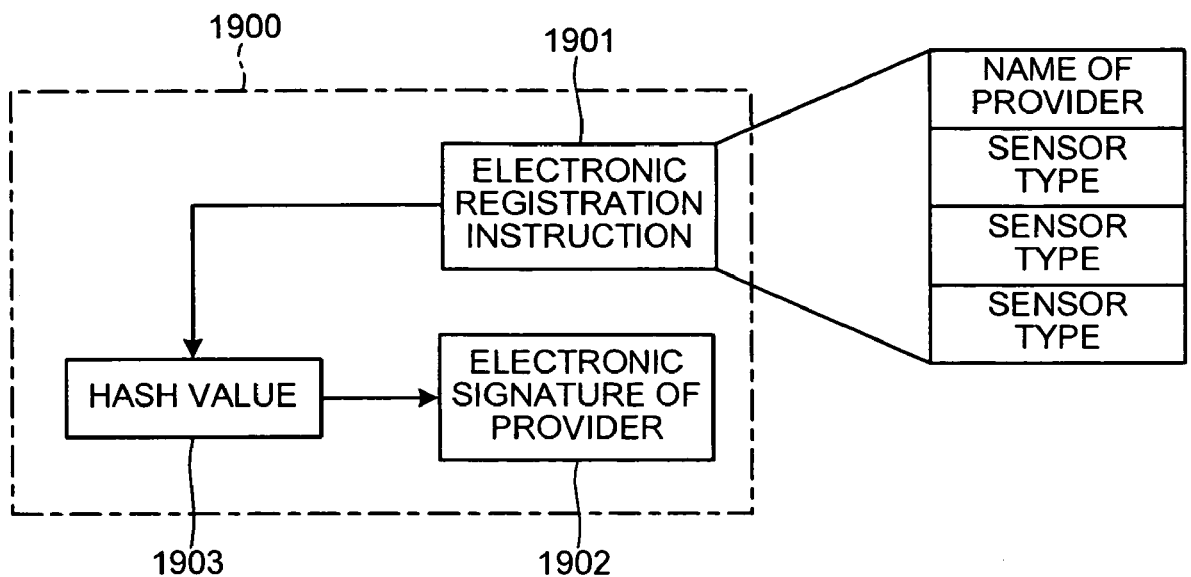
FIG. 19 is a diagram of registration instruction information.

The registration instruction information will be explained. FIG. 19 is a diagram of registration instruction information. Registration instruction information 1900 shown in FIG. 19 includes an electronic registration instruction 1901, and an electronic signature of a provider 1902 that has provided the electronic registration instruction 1901.

The electronic registration instruction 1901 is an instruction to register biological data detected by the biological sensor 211 designated by the user, and includes a name of the provider and a sensor type of the biological sensor 211 that can be available in the user's data processing apparatus 101. The electronic signature of the provider 1902 is a hash value of the electronic registration instruction 1901 encrypted by the secret key of the provider.

As shown in FIG. 18, the monitoring hardware 314 determines whether the sensor type obtained at Step S1801 is included in the electronic registration instruction 1901 (Step S1804). When the obtained sensor type is not included (Step S1804: NO), a series of the processing ends there because the biological sensor 211 that the user wants to use is not available.

On the other hand, when the obtained sensor type is included (Step S1804: YES), the monitoring hardware 314 obtains a public key of the provider that has provided the electronic registration instruction 1901 (Step S1805). For example, the monitoring hardware 314 orders the internal data authentication hardware 313 to obtain the public key of the provider. The internal data authentication hardware 313 extracts an electronic certificate of the provider from electronic certificates that are encrypted and stored in the memory/storage 300.

Then, the internal data authentication hardware 313 decrypts the extracted electronic certificate by the decryption key of the internal data authentication hardware 313, and extracts the public key from the decrypted electronic certificate. The internal data authentication hardware 313 outputs the extracted public key to the monitoring hardware 314.

Then, the monitoring hardware 314 generates a hash value by decrypting the electronic signature of the provider using the obtained public key of the provider (Step S1806). The monitoring hardware 314 also generates a message digest (a hash value) of the electronic registration instruction 1901 (Step S1807). Then, the monitoring hardware 314 outputs to the verifying hardware 315, the hash value generated at Step S1806 and the message digest generated at Step S1807.

The verifying hardware 315 determines whether the hash value generated at Step S1806 matches the message digest generated at Step S1807 (Step S1808). When the hash value does not match the message digest (Step S1808: NO), a series of the processing ends there because the electronic registration instruction 1901 might be falsified.

On the other hand, when the hash value matches the message digest (Step S1808: YES), the verifying hardware 315 orders the biometrics hardware 312 to perform the registering processing of biological data (Step S1809). At this time, the data processing apparatus 101 is ready to receive input of biological data.

Then, when biological data from the biological sensor 211 designated by the user is received (Step S1810: YES), registration data that includes a name of the user (a name of the registrant), a sensor type (for example, a fingerprint sensor, etc.), and biological data (for example, image data of a user's fingerprint) is written in the memory/storage 300 (Step S1811). For example, the internal data authentication hardware 313 encrypts and stores the registration data in the memory/storage 300 via the biometrics hardware 312. Thus, it is possible to safely and speedily register user's registration data.

Figure 20:
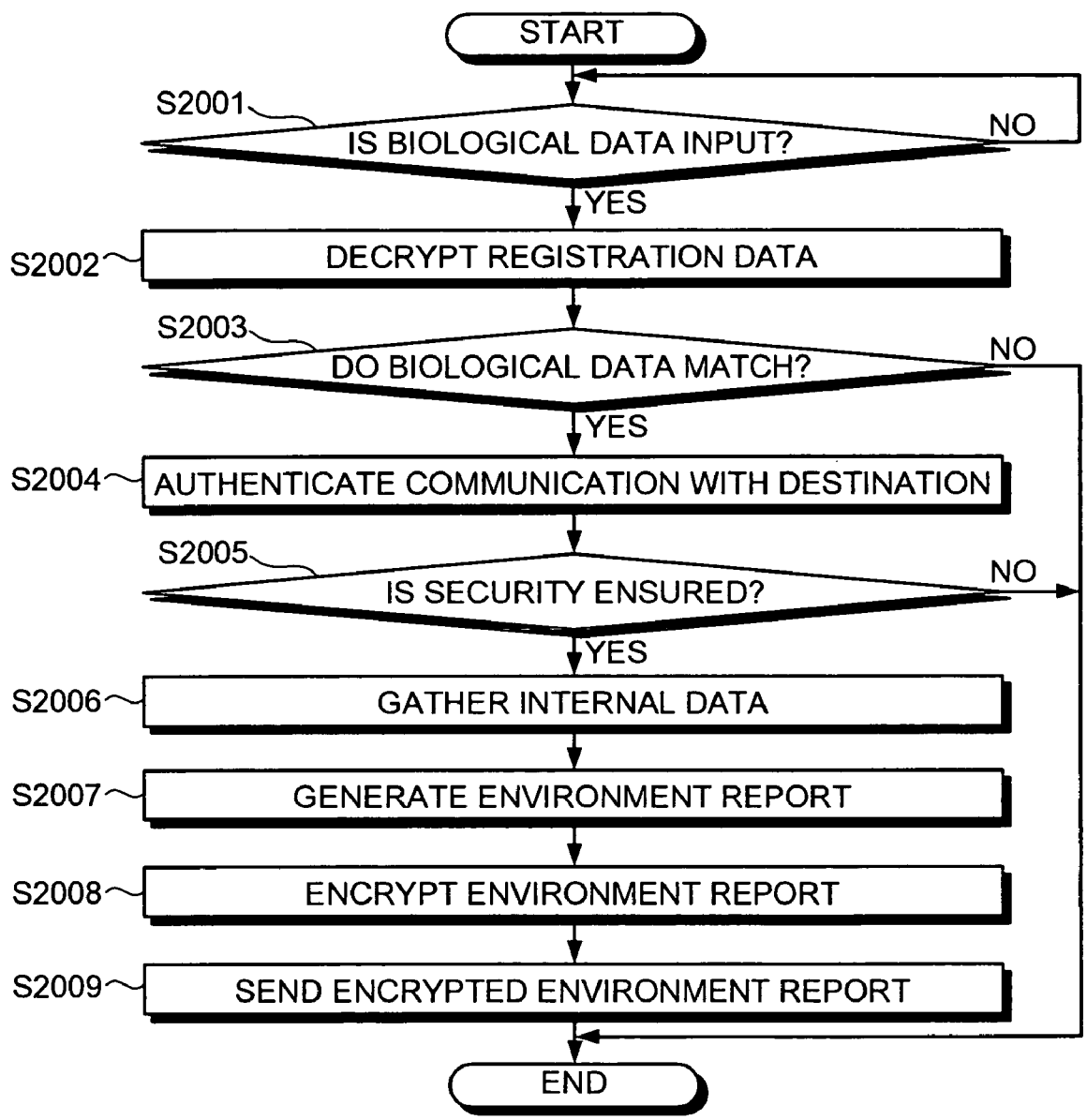
FIG. 20 is a flowchart of a procedure of normal operation of the security chip.

FIG. 20 is a flowchart of a procedure of a normal operation of the security chip 215. As shown in FIG. 20, when biological data detected by the biological sensor 211 is input (Step S2001: YES), the internal data authentication hardware 313 extracts the encrypted registration data from the memory/storage 300, and decrypts the extracted registration data by the decryption key (Step S2002).

Then, the biometrics hardware 312 compares the input biological data with the decrypted biological data. When the input biological data does not match the decrypted biological data (Step S2003: NO), a series of the processing ends there for the prohibition of unauthorized access. On the other hand, when the input biological data matches the decrypted biological data (Step S2003: YES), the communication authentication hardware 311 performs communication authentication on the communication between the data processing apparatus 101 and a destination to which an environment report is to be sent (Step S2004).

When security of the communication is not ensured (Step S2005: NO), a series of the processing ends there because the biological data might be falsified. On the other hand, when security of the communication is ensured (Step S2005: YES), the internal data authentication hardware 313 gathers internal data of the peripheral device 302, the software 301, and an execution program of each hardware (Step S2006), to generate the environment report (Step S2007).

Then, the internal data authentication hardware 313 encrypts the environment report (Step S2008), and sends the encrypted environment report with an electronic signature to the destination (Step S2009). The destination can receive and decrypt the environment report to use the report for environment authentication.

As described above, the frequency, the amount, and the method of updating a program or data for the communication authentication hardware 311, the biometrics hardware 312, and the internal data authentication hardware 313 are different, reflecting their different purposes.

However, according to the present invention, the communication authentication hardware 311, the biometrics hardware 312, and the internal data authentication hardware 313 are installed in the single security chip 215. Furthermore, update information and registration instruction information are encrypted and input through a single safe line established by the communication authentication hardware 311. Furthermore, hardware to be updated is classified by the monitoring hardware 314 (the resident program 324).

Therefore, mutual authentication among those hardware is not necessary, and safe and speedy update processing can be performed. Furthermore, even when the communication authentication hardware 311, the biometrics hardware 312, and the internal data authentication hardware 313 are installed in the single security chip 215, the security chip 215 need not to be remade to update a program. Therefore, it is possible to improve user's convenience.

Furthermore, cost can be decreased because an amount of data processed by the monitoring hardware 314 and the verifying hardware 315 (such as the patch, the electronic certificate, the electronic registration instruction, and the electronic signature) is relatively small, and the processing performed by the monitoring hardware 314 and the verifying hardware 315 (such as the decryption of the electronic signature, the comparison of hash values) is relatively simple.

According to the present invention as explained above, security can be improved by flexibly and accurately updating a program and data of biometrics, communication authentication (user (PKI) authentication), and internal data authentication (environment authentication).

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A data managing device comprising a single chip, wherein the single chip includes:
   first hardware that authenticates security of communication performed by a data processing apparatus that houses the data managing device;

second hardware that performs different processing from processing performed by the first hardware; and third hardware that receives an update program for a program executed by any one of the first hardware and the second hardware, from a data providing apparatus with which security of communication is authenticated by the first hardware, and updates the program by the update program, wherein the second hardware includes:
  internal data authentication hardware that authenticates environment data of any one of the data processing apparatus and the single chip; and
  biometrics hardware that determines whether biological data detected by a biological sensor matches biological data stored in the data processing apparatus; and the third hardware includes:
  a determining unit that determines whether a sensor type of the biological sensor input from a user of the data processing apparatus matches a sensor type stored in the data processing apparatus; and
  a second determining unit that determines whether to update the program by the update program based on a determination result of the determining unit.

2. The data managing device according to claim 1, wherein the third hardware includes:
  a receiving unit that receives, from the data providing apparatus, the update program and an electronic signature generated from the update program using a secret key of the data providing apparatus,
  wherein the second determining unit determines whether to update the program by the update program, based on a message digest of the update program, the electronic signature, and a public key of the data providing apparatus; and
  an updating unit that updates the program by the update program based on a determination result of the second determining unit.

3. The data managing device according to claim 2, wherein:
  the receiving unit further receives, from the data providing apparatus, an electronic certificate of the data providing apparatus and a second electronic signature generated from the electronic certificate using a secret key of a certificate authority; and
  the first hardware authenticates security of communication between the data processing apparatus and the data providing apparatus, based on a message digest of the electronic certificate, the second electronic signature, and a public key of the certificate authority.

4. The data managing device according to claim 3, wherein the public key of the certificate authority is obtained by decrypting an electronic certificate of the certificate authority stored in the data processing apparatus.

5. The data managing device according to claim 2, wherein:
  the receiving unit further receives a third electronic signature from the data providing apparatus; and
  the third hardware further includes a verifying unit that verifies whether the program is successfully updated, based on a message digest of the program updated by the updating unit, the third electronic signature, and the public key of the data providing apparatus.

6. The data managing device according to claim 5, wherein the public key of the data providing apparatus is obtained by decrypting an electronic certificate of the data providing apparatus stored in the data processing apparatus.

7. The data managing device according to claim 1, wherein the third hardware includes:
  a second receiving unit that receives, from the data providing apparatus, an electronic registration instruction for a registration of biological data to the data processing apparatus, and an electronic signature generated from the electronic registration instruction using a secret key of the data providing apparatus;
  a third determining unit that determines whether to register biological data based on the electronic registration instruction, the electronic signature, and the public key of the data providing apparatus, when a sensor type designated in the electronic registration instruction matches a sensor type of the biological sensor input from a user of the data processing apparatus; and
  a registering unit that registers biological data input from the user, based on a determination result of the third determining unit.

8. The data managing device according to claim 7, wherein the public key of the data providing apparatus is obtained by decrypting an electronic certificate stored in the data processing apparatus.

9. The data managing device according to claim 7, wherein:
  the third hardware includes an encrypting unit that encrypts the biological data using the public key of the data providing apparatus; and
  the registering unit registers the biological data encrypted by the encrypting unit.

10. A data managing method for a data managing device that is housed in a data processing apparatus and includes a single chip with first hardware and second hardware, wherein the first hardware authenticates security of communication performed by the data processing apparatus and the second hardware performs different processing from processing performed by the first hardware, the data managing method comprising:
  receiving an update program for a program executed by any one of the first hardware and the second hardware, from a data providing apparatus with which security of communication is authenticated by the first hardware; and
  updating the program by the update program;
  authenticating, by an internal data authentication hardware included in the second hardware, environment data of any one of the data processing apparatus and the single chip;
  determining, by a biometric hardware included in the second hardware, whether biological data detected by a biological sensor matches biological data stored in the data processing apparatus;
  determining whether a sensor type of the biological sensor input from a user of the data processing apparatus matches a sensor type stored in the data processing apparatus; and
  determining whether to update the program by the update program, based on a determination result of the determining whether the sensor type of the biological sensor input form the user of the data processing apparatus matches the sensor type stored in the data processing apparatus.

* * * * *